United States Patent [19]

Imaizumi et al.

[11] Patent Number: 5,170,288
[45] Date of Patent: * Dec. 8, 1992

[54] SELF-CLEANING APPARATUS FOR REMOVAL OF FOREIGN SUBSTANCES FROM A PLATE-LIKE DEVICE

[75] Inventors: Tomoaki Imaizumi; Koji Ito; Shoji Okada; Naofumi Fujie, all of Aichi, Japan

[73] Assignee: Aisin Seiki Kabushiki Kaisha, Kariya, Japan

[*] Notice: The portion of the term of this patent subsequent to May 7, 2008 has been disclaimed.

[21] Appl. No.: 765,497

[22] Filed: Sep. 26, 1991

Related U.S. Application Data

[63] Continuation of Ser. No. 431,205, Nov. 3, 1989, abandoned.

[30] Foreign Application Priority Data

Nov. 9, 1988 [JP] Japan .................. 63-283233

[51] Int. Cl.⁵ .................. B60R 1/06; G02B 5/08; F26B 5/02
[52] U.S. Cl. .................. 359/507; 15/250.02; 15/250.13; 15/250.2; 15/250.003; 310/316; 310/320; 310/323; 310/330; 34/1 G; 34/69; 318/114
[58] Field of Search .................. 350/582, 583, 584, 588; 15/250 R, 250 B, 250.02, 250.12, 250.13, 250.14, 250.2; 359/507, 509; 310/320, 321, 322, 323, 326, 330, 335, 368; 34/1 G, 69; 318/114

[56] References Cited

U.S. PATENT DOCUMENTS

| | | | |
|---|---|---|---|
| 3,609,450 | 9/1971 | Hart | 350/584 |
| 3,711,179 | 1/1973 | Takeda | 350/583 |
| 4,387,973 | 6/1983 | Martin | 350/582 |
| 4,768,256 | 9/1988 | Motoda | 15/250 R |
| 4,833,373 | 5/1989 | Doi et al. . | |
| 4,929,072 | 5/1990 | Fujie et al. | 15/250 B |
| 4,940,322 | 7/1990 | Hamamoto et al. | 350/637 |
| 5,007,722 | 4/1991 | Mori et al. | 359/507 |
| 5,012,593 | 5/1991 | Okada et al. | 15/250 B |
| 5,013,888 | 5/1991 | Okada et al. | 219/219 |
| 5,025,187 | 6/1991 | Fujie et al. | 15/250 R |
| 5,037,189 | 8/1991 | Fujie et al. | 359/507 |

FOREIGN PATENT DOCUMENTS

| | | | |
|---|---|---|---|
| 59-8548 | 1/1984 | Japan . | |
| 59-40145 | 3/1984 | Japan . | |
| 61-30552 | 2/1986 | Japan . | |
| 0036038 | 2/1986 | Japan | 350/582 |
| 62-150201 | 7/1987 | Japan | 350/582 |
| 62-238149 | 10/1987 | Japan . | |
| 62-191550 | 12/1987 | Japan . | |
| 1079732 | 8/1967 | United Kingdom | 350/582 |

Primary Examiner—Bruce Y. Arnold
Assistant Examiner—R. D. Shafer
Attorney, Agent, or Firm—Burns, Doane, Swecker & Mathis

[57] ABSTRACT

An arrangement is provided for removing foreign substances from a mirror. A vibrator for vibrating the mirror includes a vibration controlling unit for supplying power to the vibrator. As the vibration controlling unit is located close to the vibrator, the length of the conductive wire which transmits the power can be minimized so as to reduce radio noise. The heat generated by the vibration control unit can be radiated sufficiently through a metallic case member and the vibration controlling unit can be disposed in the closed, small space between the mirror and the housing. Therefore, the size of the housing can be reduced so as to minimize the space which surrounds the vibration control unit. Further, the vibration control unit can be protected from contamination due to the closed case member.

10 Claims, 4 Drawing Sheets

SELF-CLEANING APPARATUS FOR REMOVAL OF FOREIGN SUBSTANCES FROM A PLATE-LIKE DEVICE

This application is a continuation of application Ser. No. 07/431,205, filed Nov. 3, 1989, now abandoned.

BACKGROUND OF THE INVENTION

1. Field of the Invention

This invention relates to an apparatus for removing foreign substances such as water droplets, ice and frost, for example, from a surface.

2. Description of the Related Art

Japanese utility model laid-open patent No. 61-30552, published on Feb. 24, 1986, discloses a conventional apparatus of the above-described type.

FIG. 5 is a cross-sectional view of the conventional apparatus which is adapted to an automotive rear-view mirror 72. A mirror 71 is supported by a stay or support 73 via a vibrator 74. An oscillator 76 is electrically connected to the vibrator 74. A switch 75 is electrically connected between a battery 77 and the oscillator 76. The switch 75 is disposed in a compartment of the automobile so as to be easily accessible by a driver or passenger of the automobile.

When the switch 75 is turn on, the vibrator 74 vibrates the mirror 71. The vibration of the mirror 74 quickly removes foreign substances, such as water droplets, ice and frost.

However, the vibrator 74 may generate a radio wavelength noise, because an A.C. signal having high voltage and high frequency is supplied to the vibrator 74 from the oscillator 76. The radio noise may undesirably interfere with other electronic devices.

Another apparatus which is quite similar to the above conventional apparatus is disclosed in U.S. Pat. No. 4,833,373 published on May 23, 1989. A corresponding application of this U.S. Patent is disclosed in Japanese laid-open patent No. 62-238149 published on Oct. 19, 1987.

SUMMARY OF THE INVENTION

Accordingly, one of the objects of this invention is to obviate the above conventional drawbacks.

It is also an object of this invention to reduce the radio noise generated in the conventional device.

To achieve the above objects, and in accordance with the principles of the invention as embodied and broadly described herein, the self-cleaning apparatus for removing foreign substances includes a generally planer member, a vibrating device for vibrating the planer member, and an vibration controlling arrangement provided close to the plate shaped member which supplies A.C. power to the vibrating device.

BRIEF DESCRIPTION OF THE DRAWINGS

The accompanying drawings, which constitute a part of the specification, illustrate an embodiment of the invention and with the description serve to explain the principles of the invention. Of the drawings.

DETAILED DESCRIPTION OF A PREFERRED EMBODIMENT

Reference will now be made in detail to a present preferred embodiment of the invention, an example of which is illustrated in the accompanying drawings.

Figure 1:
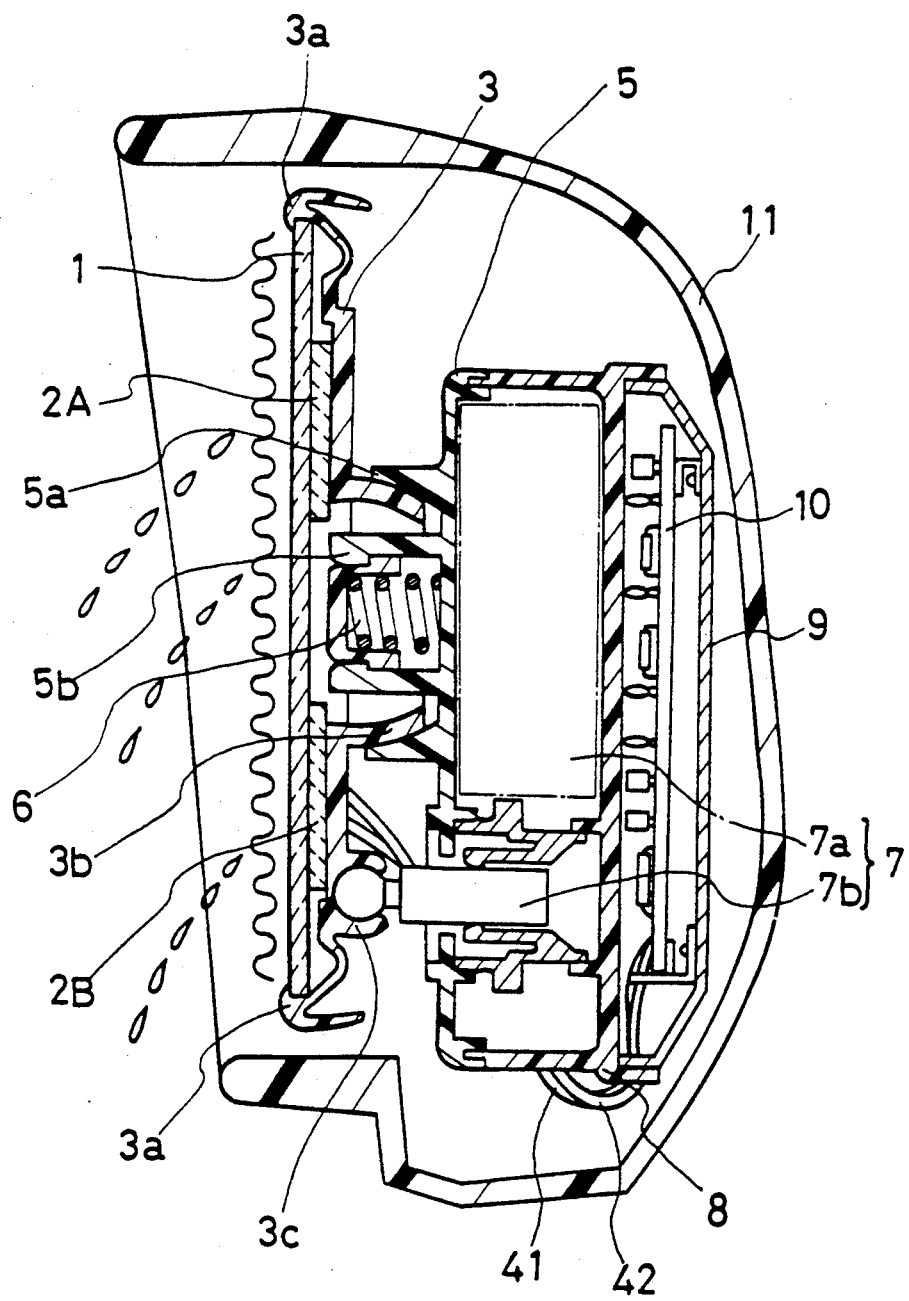
FIG. 1 is a cross-sectional view of an automotive rear view mirror in accordance with this invention.

Referring now to FIG. 1, a mechanical construction of this embodiment will be explained. Two piezoelectric vibrators 2A, 2B are adhered or otherwise secured to a planar member identified as a mirror 1. The vibrators 2A, 2B are expanded and contracted repeatedly in a radial direction thereof when A.C. power is supplied to the vibrators 2A, 2B.

A housing 11 is fixed to an automotive body (not shown). The housing is preferably made of a synthetic resin or metal. A base member 8 is fixed to the housing 11 rigidly by screws or other fastening arrangements (not shown). A cover member 5 is adhered or connected to the base member 8 in an integral manner. A joint or lip portion 5a is formed on the cover member 5. A joint portion 3b of the mirror base 3 is fitted into the joint portion 5a so as to provide an adjustable arrangement for the mirror 1. A coil spring 6 is positioned between projections 5b provided between the joint portions 3b, 5a in a space provided between the joint portions 3b, 5a. An angle adjuster 7 is fixed or connected to the base member 8. The angle adjuster 7 comprises an actuator portion 7a and an output rod portion 7b. One end of the output rod 7b is connected to a joint portion 3c of the mirror base 3. The mirror base 3 changes directions according to movement of the output rod 7b.

A holding portion 3a is formed integrally with the mirror base 3. The holding portion 3a holds an outer circumference of the mirror 1. The holding portion 3a is fully elastic so as to not inhibit or prevent the vibration of the mirror 1.

A case member 9 is fixed to the base member 8. The case member 9 is made of metal or suitable material. An electronic circuit board 10 is disposed in a space between the base member 8 and the case member 9.

Figure 2:
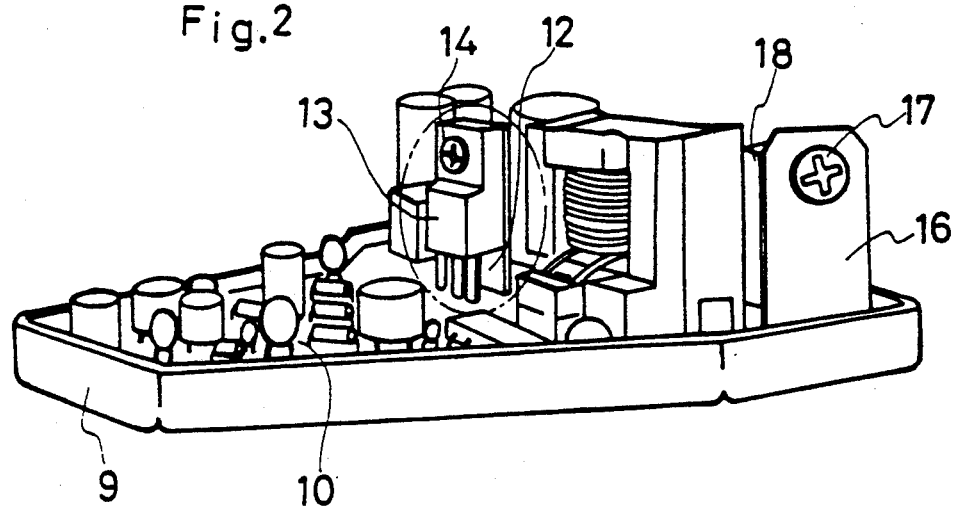
FIG. 2 is a perspective view of an oscillator circuit board in accordance with this invention.
Figure 2A:
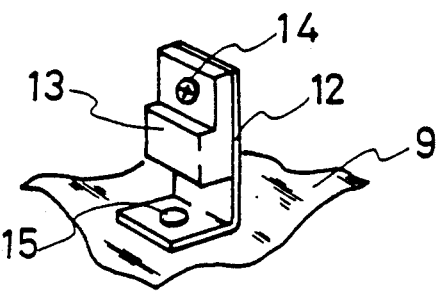
FIG. 2a is an enlarged view of a portion of the circuit board of FIG. 2.
Figure 5:
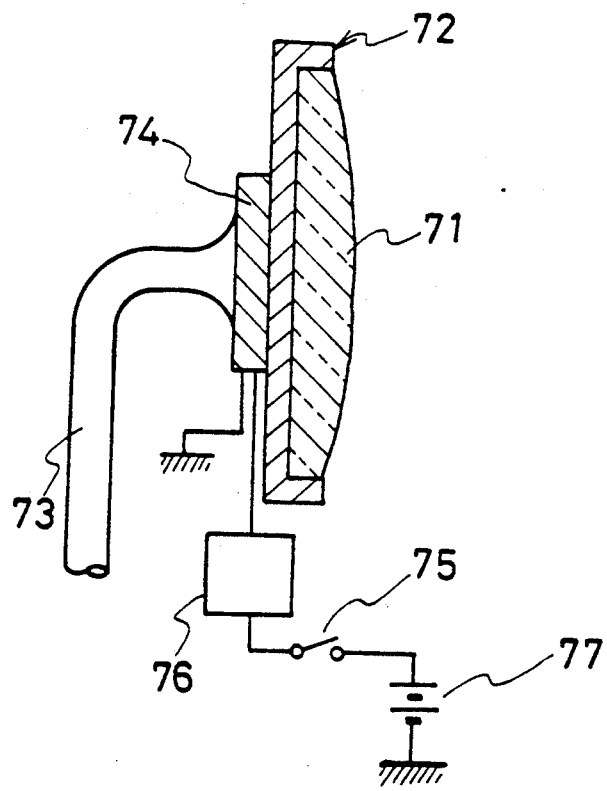
FIG. 5 is a cross-sectional view of a conventional automotive rear view mirror.

Referring now to FIGS. 2 and 2a, the electronic circuit board 10 will be explained.

The case member 9 acts as a radiating plate for radiating heat generated by the circuit board 10. The heat of the circuit board 10 is mainly generated by a semiconductor 13 for regulating power supplied to the vibrators 2A, 2B. Such semiconductor 13 is fixed to an "L" shaped plate 12 by a screw or other fastening device 14. The "L" shaped plate 12, which is made of metal, is fixed to the case member 9 by a rivet or similar connector 15. The heat which is generated by the semiconductor 13 is conducted by the case member 9 through the "L" shaped plate 12. Further, in the same manner as the semiconductor 13, the other semiconductor 18 is fixed to the other "L" shaped plate 16 by a screw or other similar fastening device 17. The "L" shaped plate 16 is also fixed to the case member 9 by a rivet (not shown). Heat which is generated by the semiconductor 18 is also conducted to the case member 9. Thus, the case member 9 is utilized for radiating the heat generated by the circuit board 10. Therefore, the circuit board 10 can be installed in a closed space between the base member 8 and the case member 9 and will not generate an excessive amount of heat.

Figure 4:
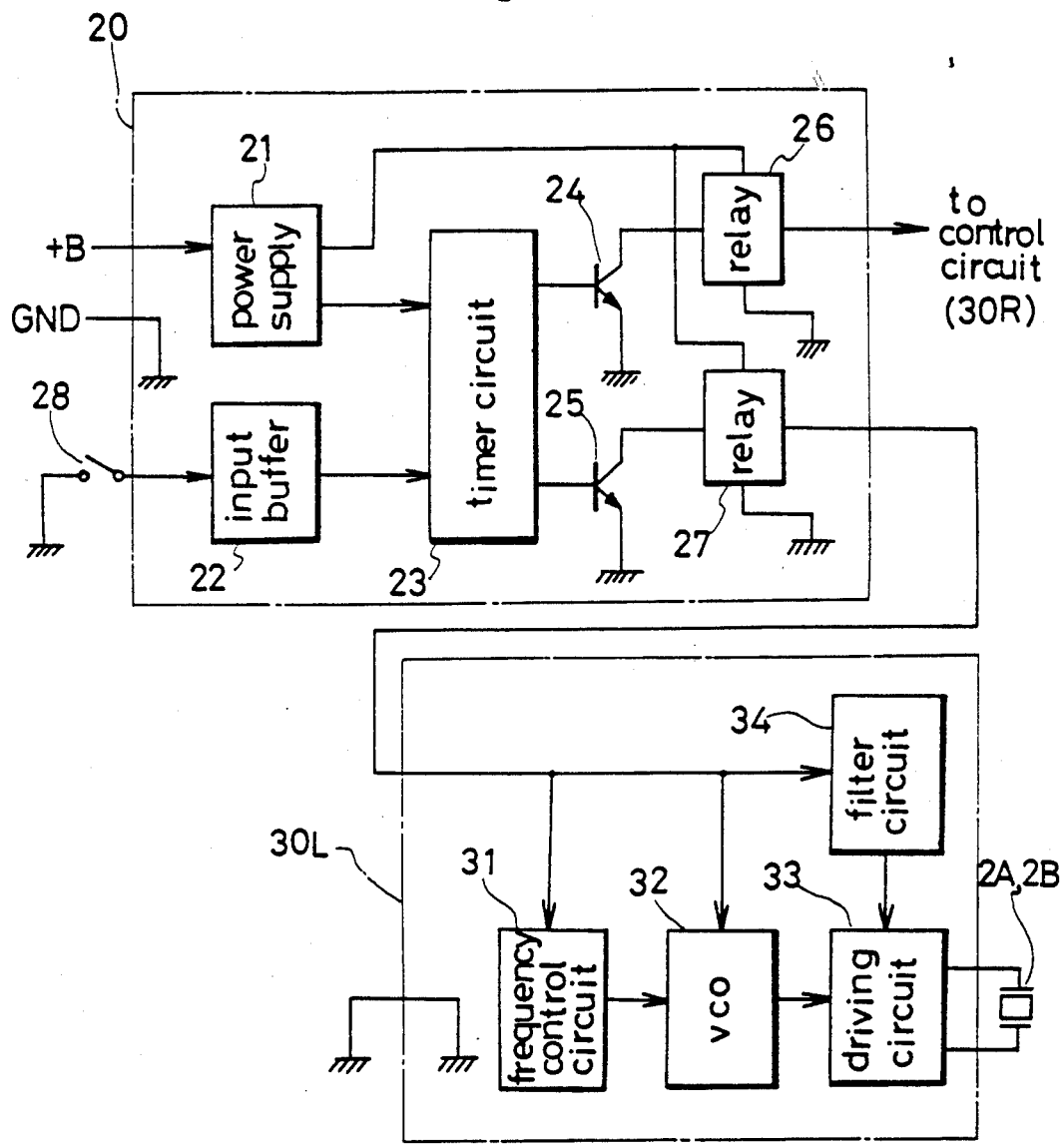
FIG. 4 is a block diagram showing an electronic control circuit in accordance with this invention.

Referring now to FIG. 4, an electronic control circuit will be explained. A power control unit 20 comprises a power supply 21, an input buffer 22, a timer circuit 23, transistors 24, 25 and relays 26, 27. The power control unit 20 is disposed in a compartment of the automobile. The power control unit 20 is disposed separate from the circuit board 10.

A start switch 28 is also positioned in the compartment so as to be easily accessible. The start switch 28 is connected to the input buffer 22. The input buffer 22 generates an "L" level signal when the switch 28 is turned on. To the contrary, the input buffer 22 generates an "H" level signal while the switch 28 is turned off. The timer circuit 23 generates an "H" level signal for a predetermined period of time after the input buffer 22 generates the "L" level signal. The timer circuit 23 receives power from the power supply 21 which is connected to a battery (not shown) on the automobile.

The power control unit 20 supplies the electric power to vibration control circuits 30L, 30R. The vibration control circuits 30L, 30R are installed on each circuit board 10 in left and right automotive rear view mirrors (not shown).

The output from the timer circuit 23 drives the relays 26, 27 through the transistors 24, 25. The relay 27 connects a vibration control circuit 30L for the left side rear view mirror (not shown) to the battery (not shown) when the timer circuit 23 generates an "H" level signal. The relay 26 connects a vibration control circuit 30R for the right side rear view mirror (not shown) when the timer circuit 23 generates an "H" level signal. The vibration control circuit 30R is the same circuit as the control circuit 30L. Therefore, an explanation of the control circuit 30R is omitted to avoid duplication of description.

The control circuit 30L comprises a frequency control circuit 31, a voltage controlled oscillator circuit 32, a driving circuit 33 and a filter circuit 33. The frequency control circuit 31 generates a saw tooth wave voltage which varies a voltage level in response to the elapsed time. The voltage controlled oscillator 32 varies the generated frequency in response to the varied voltage level from the frequency control circuit 31. The driving circuit 33 increases the voltage of the signal which is fed from the voltage controlled oscillator 32. The filter circuit 34 prevent the generation of noise, which would otherwise be generated by the driving circuit 33 and the vibrators 2A, 2B, from being transmitted to the power supply 21.

Figure 3A:
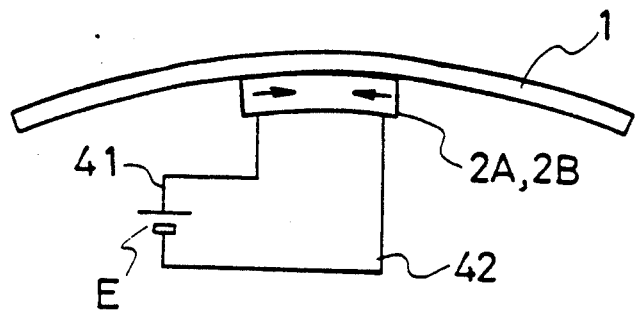
FIGS. 3a, 3b and 3c show an operation of the device in accordance with the present invention.
Figure 3B:
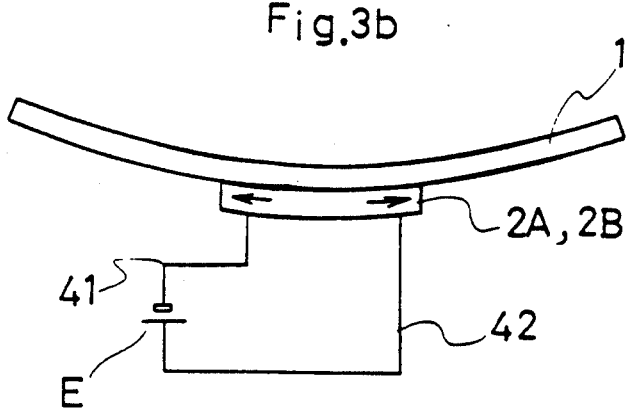
Figure 3C:
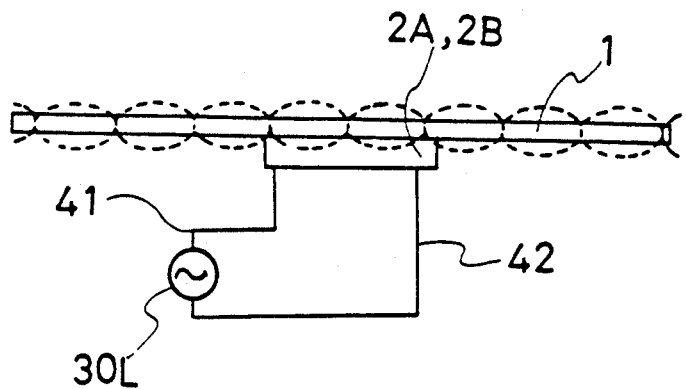

Referring now to FIGS. 3a, 3b and 3c, an operation of this embodiment will be explained.

As shown in FIG. 3a, when a conductive wire 41 is connected to a plus terminal of a D.C. power supply and the other conductive wire 42 is connected to a minus terminal of a D.C. power supply, the vibrators 2A, 2B contract. The mirror 1 is bent due to a strong contracting force transmitted from the vibrators 2A, 2B.

As shown in FIG. 3b, when the conductive wire 41 is connected to the minus terminal of the D.C. power supply and the conductive wire 42 is connected to the plus terminal of the D.C. power supply, the vibrators 2A, 2B expand. The mirror 1 is bent reversely to the contracting direction due to a strong expanding force transmitted from the vibrators 2A, 2B.

As shown in FIG. 3c, when the conductive wires 41, 42 are connected to the control circuit 30L, the mirror 1 is bent back and forth. As long as the frequency of the control circuit 30L is properly predetermined, the mirror 1 may be resonated and a standing wave will be generated on the mirror 1. When the mirror 1 is resonated, water droplets are atomized and dropped off from the mirror 1.

The control circuit 30L varies the frequency which is supplied to the mirror 1. Therefore, nodes and loops of the standing wave are moved on the mirror 1 so as to remove the water droplets uniformly from the whole of the mirror 1.

In this embodiment, the circuit board 10 which provides the high frequency signals is installed in the housing 11. Therefore, the conductive wires 41, 42 can be disposed in a space between the mirror 1 and the housing 11. Thus, lengths of the conductive wire 41, 42 are minimized so as to reduce the radio noise. Further, the filter circuit 34 prevents the noise from transmitting to the power supply 21. Consequently, the radio noise otherwise generated will be reduced.

The heat which is generated by the circuit board 10 can be radiated sufficiently through the case member 9. Therefore, the circuit board 10 can be installed in the closed, small space between the mirror 1 and the housing 11. Thus, the size of the housing 11 can be reduced so as to minimize the space which surrounds the circuit board 10. Further, the circuit board 10 can be protected from the water droplets and dust due to the arrangement of the closed case member 9.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A self-cleaning apparatus for removing foreign substances from a surface comprising:

a substantially planar member;

a plurality of vibrating means for vibrating the planar member, the vibrating means contracting and expanding in a radial direction, the contracting and expanding of the vibrating means transmitted to said planar member to contract and expand said planar member;

vibration controlling means for driving the vibrating means at a predetermined frequency;

housing means for integrally housing the planar member, the vibrating means and the vibration controlling means; and power controlling means including a timer circuit for supplying electric power to the vibration controlling means, wherein the power controlling means is separately disposed exteriorly of the housing means.

2. The apparatus according to claim 1 wherein the vibration control means further comprises:

a circuit board including power transmitting means for transmitting power to the vibrating means; and metallic case means for enclosing the circuit board.

3. The apparatus according to claim 1 wherein said vibration controlling means comprises a pair of vibration controlling means.

4. The apparatus according to claim 1, further comprising:
- a base member positioned interiorly of the housing means and supporting said planar member;
- a case member connected to said base member;
- a space defined between said base member and said case member; and
- a circuit board for supporting said vibrating means and the vibration controlling means positioned in said space.

5. A self-cleaning apparatus for removing foreign substances from a surface comprising:
- a substantially planar member;
- vibrating means for vibrating the planar member;
- vibration controlling means for driving the vibrating means at a predetermined frequency, the vibrating means being expanded and contracted in a radial direction so as to expand and contract the planar member;
- housing means for integrally housing the planar member, the vibrating means and the vibration controlling means;
- a circuit board including power transmitting means for transmitting power to the vibrating means; and
- metallic case means for enclosing the circuit board.

6. The apparatus according to claim 5 wherein said vibration controlling means comprises a pair of vibration controlling means.

7. The apparatus according to claim 5, further comprising:
- a base member positioned interiorly of the housing means and supporting said planar member, said metallic case means connected to said base member so as to define a space therebetween for enclosing said circuit board.

8. A self-cleaning apparatus for removing foreign substances from a surface comprising:
- a substantially planar member;
- vibrating means expanding and contracting in a radial direction for vibrating the planar member so as to bend the planar member;
- vibration controlling means for driving the vibrating means at a predetermined frequency;
- housing means for integrally housing the planar member, the vibrating means and the vibration controlling means;
- power controlling means including a timer circuit for supplying electric power to the vibration controlling means, wherein the power controlling means is separately disposed exteriorly of the housing means;
- a circuit board including power transmitting means for transmitting power to the vibrating means; and
- metallic case means for enclosing the circuit board.

9. The apparatus according to claim 8 wherein said vibration controlling means comprises a pair of vibration controlling means.

10. The apparatus according to claim 8, further comprising:
- a base member positioned interiorly of the housing means and supporting said planar member, said metallic case means connected to said base member so as to define a space therebetween for enclosing said circuit board.

* * * * *